Sept. 19, 1967 G. I. TSUDA 3,343,069

PARAMETRIC FREQUENCY DOUBLER-LIMITER

Filed Dec. 19, 1963 3 Sheets-Sheet 1

INVENTOR.
GEORGE I. TSUDA,
BY Robert H. Himes
ATTORNEY.

PARAMETRIC FREQUENCY DOUBLER-LIMITER

Filed Dec. 19, 1963 3 Sheets-Sheet 2

INVENTOR.
GEORGE I. TSUDA,
BY
Robert W. Hines
ATTORNEY.

Sept. 19, 1967 G. I. TSUDA 3,343,069

PARAMETRIC FREQUENCY DOUBLER-LIMITER

Filed Dec. 19, 1963 3 Sheets-Sheet 3

INVENTOR.
GEORGE I. TSUDA,
BY Robert H. Hines
ATTORNEY.

3,343,069
PARAMETRIC FREQUENCY DOUBLER-LIMITER
George I. Tsuda, Garden Grove, Calif., assignor to Hughes Aircraft Company, a corporation of Delaware
Filed Dec. 19, 1963, Ser. No. 331,971
8 Claims. (Cl. 321—69)

ABSTRACT OF THE DISCLOSURE

An apparatus for doubling the frequency and limiting the amplitude of an input signal over a broad range of frequencies. In general, the device features the use of an isolating apparatus in combination with a parametric type apparatus employing a varactor diode. In particular, the parametric type apparatus includes bandpass and band-rejection filters fabricated by staggering one-quarter wavelength stripline stubs about selected junctions along a stripline conductor.

This invention relates to a device for doubling the frequency and limiting the amplitude of a signal over a broad range of frequencies and, more particularly, to an electromagnetic stripline apparatus incorporating improved stripline filters capable of operating over a broad range of frequencies.

Present day microwave frequency doublers are generally complex devices that are difficult to fabricate and rarely achieve operation over a wide range of frequencies while developing an output signal of substantially constant amplitude.

It is therefore an object of the invention to provide an improved parametric frequency doubler capable of operating over a broad range of frequencies.

Another object of the present invention is to provide a parametric frequency doubler capable of developing an output signal having a substantially constant power level over a wide frequency range.

Still another object of the invention is to provide a parametric frequency doubler-limiter that is both electrically and mechanically simple to fabricate.

A further object of the invention is to provide frequency doublers capable of being cascaded to effect frequency multiplication without bandwidth shrinkage.

A still further object of the present invention is to provide a stripline filter operable over a predetermined band of frequencies that is simple and economical to construct.

The above-mentioned and other features and objects of this invention and the manner of obtaining them will become more apparent by reference to the following description taken in conjunction with the accompanying drawings, wherein.

Figure 1:
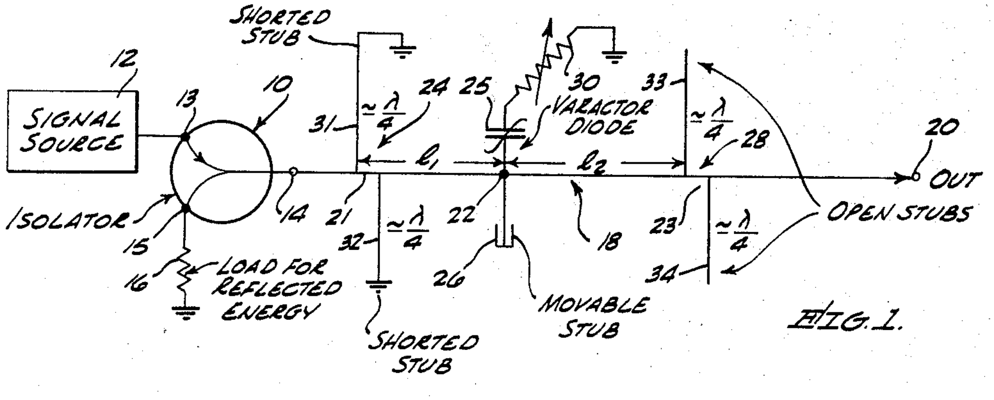
FIG. 1 illustrates a schematic circuit diagram of the parametric frequency doubler of the invention.

Referring now to FIG. 1 of the drawings, there is shown a schematic circuit diagram of the apparatus of the present invention. In particular, an isolator 10 receives signal energy from a signal source 12 at an input terminal 13 and transmits this signal energy to a junction 14. Isolator 10 is characterized in that electrical energy reflected back to junction 14 is diverted to an output junction 15 where it is dissipated in a load 16 rather than allowing it to return to signal source 12 to produce a mismatch. Isolator 10 may take the form of a circulator or other equivalent device.

Figure 5:
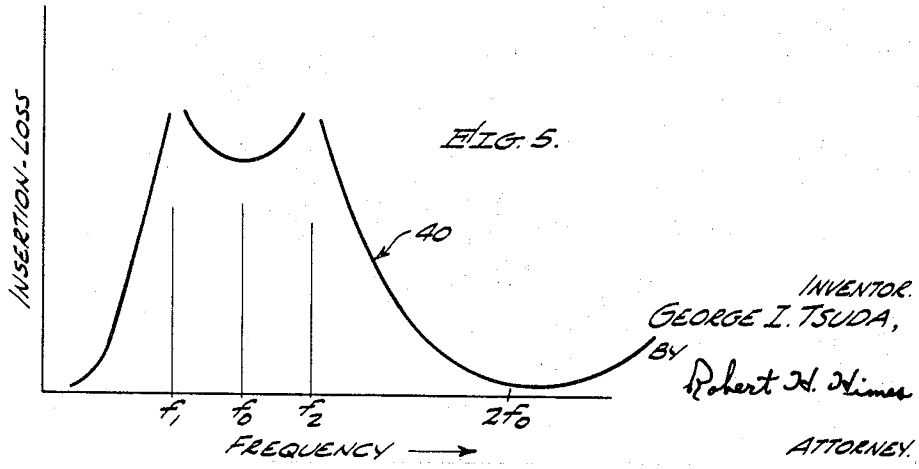
FIG. 5 illustrates the bandpass and band-rejection characteristics of the staggered doubler stub filters employed in the device of FIG. 1.
Figure 3A:
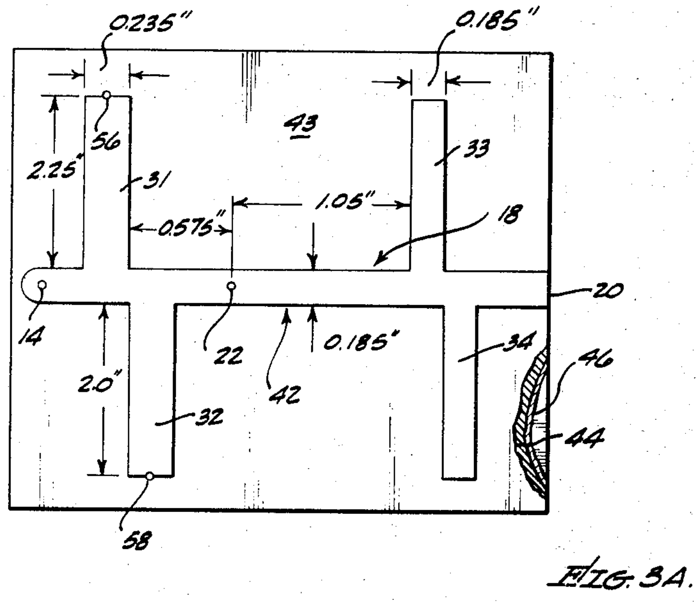
FIGS. 3A and 3B illustrate plan views of alternate center stripline configurations for the stripline circuitry in the device of FIG. 1.

The remaining portion of the device of the present invention includes a transmission line 18 connected from junction 14 to an output junction 20 and having intermediate junctions 21, 22 and 23 disposed therealong in the order named proceeding from junction 14 to output junction 20. The manner of achieving optimum spacing between junctions 21 and 22 and between junctions 22 and 23 will be hereinafter described. In accordance with the present invention, a bandpass filter 24 having a mean frequency equal to the fundamental frequency of the signal provided by signal source 12 is interposed in the transmission line 18 at the junction 21; a varactor diode 25 together with a movable tuning stub 26 is connected to the junction 22; and a band-rejection filter 28 is interposed in the transmission line 18 at the junction 23. The remaining unconnected terminal of varactor diode 25 is referenced to ground through a variable resistor 30 which generally has a very high resistance. Also, the characteristic 40, FIG. 5, representing both the bandpass and band-rejection characteristics of bandpass filter 24 and band-rejection filter 28, respectively, does not include the second harmonic frequency of the signal provided by signal source 12. That is, the bandpass characteristic of bandpass filter 24 is sufficiently narrow to reject twice the fundamental frequency of the signal provided by signal source 12, and the characteristic of band-rejection filter 28 is sufficiently narrow to pass a signal having a frequency equal to the second harmonic of the signal from source 12. Lastly, the spacing between junctions 21, 22 and 23 along transmission line 18 is selected to produce maximum output power at the second harmonic frequency for a given input fundamental frequency of the signal provided by signal generator 12. To achieve this, the distance, $l_1$, between junctions 21, 22 is chosen to effect resonance with the average capacitance of the varactor diode 25 for the second harmonic frequency of the input signal, and the spacing, $l_2$, between junctions 22, 23 is selected to achieve optimum impedance match for the fundamental frequency of the applied signal. The distances, $l_1$ and $l_2$, will, of course, vary with the frequency operation. FIG. 3A describes distances for a stripline device designed for L-band operation.

A preferred embodiment of the present invention employs a stripline circuitry for the transmission line 18, the bandpass filter 24 and the band-rejection filter 28. In this event, ground planes (not shown in FIG. 1) are disposed on both sides of the stripline portions of the circuitry. Staggered stripline stubs 31, 32, approximately one-quater wavelengths long are connected to opposite sides of the center strip of transmission line 18 at junction 21 and the extremities thereof shorted to the associated ground planes, and the band-rejection filter 28 is provided by staggered stripline stubs 33, 34 connected to opposite sides of the center conductor of stripline transmission line 18 at junction 23. Further details concerning the degree of staggering of the stubs 31, 32 and 33, 34, together with the dimensions of the stripline circuitry and the mounts for varactor diode 25 and movable stub 26, are described in connection with FIGS. 2, 3A, 3B and 4.

Figure 2:
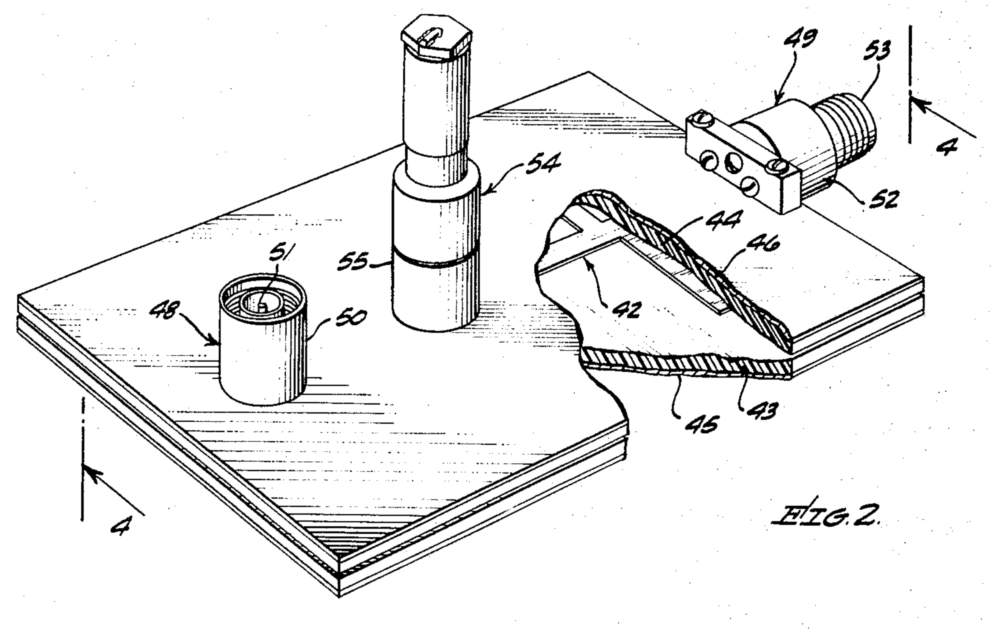
FIG. 2 illustrates a perspective view of the stripline portion of the apparatus shown schematically in FIG. 1 partially cutaway to show the electrical circuit construction.

Referring now to FIG. 2 of the drawings, there is shown a partially cutaway perspective view of a stripline embodiment of the circuitry of FIG. 1 from junction 14 to output junction 20. In particular, this embodiment includes a center stripline network 42 sandwiched between coextensive dielectric layers 43, 44 which may each be of the order of 0.25" thick. On the outer surface of the dielectric layers 43, 44, there is disposed conductive sheets 45, 46, respectively, which provide the ground planes for the center stripline network 42. Coaxial connectors 48, 49 connect to opposite extremities corresponding to junctions 14, 20, respectively, of the stripline network 42. In particular, coaxial connector 48 includes an outer shell 50 that is in electrical contact with conductive sheets 45, 46 and a center conductor 51 that is in electrical contact with junction 14 of the stripline network 42. Coaxial connector 49, on the other hand, includes an outer connector 52 in electric contact with both conductive sheets 45 and 46, and a center conductor 53, visible in the cross-section shown in FIG. 4, which connects to junction 20 of the stripline network 42. Also, varactor diode 25 is mounted in a varactor diode housing 54 which includes an outer shell 55 electrically connected to conductive sheet 46. Additional details of varactor diode housing 54 are hereinafter described in connection with FIG. 4. The movable stub 26, FIG. 1, is not visible in FIG. 2.

Referring to FIG. 3A, there is shown a plan view of an embodiment of the stripline network 42, FIG. 2. In particular, the stripline network 42 is disposed on the dielectric layer 43 and is covered by the dielectric layer 44 and conductive sheet 46 shown cut-away for the purposes of illustration. The center conductor 51 of coaxial connector 48 connects to the junction 14 and the center conductor 53 of coaxial connector 49 connects to the junction 20. Extending from junctions 14 and 20, there is a flat conductive strip that is 0.185" in width. The stubs 31, 32, extending outwards from junction 21, are provided by 0.235" wide conductive strips 2.25" and 2.10" in length, respectively. In this instance, these lengths approximate one-quarter wavelength at the fundamental frequency of the signal generated by source 12. Although one-quarter wavelength in the present case is used to achieve broadband operation, any odd multiple of one-quarter wavelengths can be used, the effect being to decrease the passband of the filter. The extremities of stubs 31, 32 are connected to the conductive sheets 45, 46 at the junctions 56, 58, respectively. Lastly, the edge of stub 31 farthest from junction 14 is disposed directly opposite the edge of stub 32 nearest junction 14 to achieve maximum separation of the characteristic 40 of the bandpass and band-rejection filters 24, 28. If in the event maximum separation of the frequencies, $f_1$ and $f_2$, of characteristic 40, as illustrated in the drawing, is not required, the extent to which stubs 31, 32 are staggered may be decreased. In general, staggering may vary from one-half the width of the stubs to the full width thereof as illustrated. The stubs 33, 34 which constitute the band-rejection filter are provided by 0.185" wide conductive strips disposed on opposite sides of the center conductor of transmision line 18 at junction 23, the edge of conductive strip constituting stub 33 nearest junction 14 being spaced 1.625" from the nearest edge of stub 31. The lengths of the stubs 33, 34 are the same as the stubs 31, 32, respectively, and may be varied in the same manner as previously described if a narrower bandwidth is desired. With regard to placement, stub 34 is disposed with the edge farthest from the junction 14 directly opposite the edge of stub 33 nearest junction 14. The staggering of stubs 33, 34 may be varied in the same manner as the stubs 31, 32. The junction 22 of the center conductor of transmission line 18, to which one extremity of the varactor diode 25 is connected, is disposed 1.05" from the edge of stub 31 farthest from junction 14. The foregoing dimensions are selected for a microwave device adapted to operate throughout the L-band.

Figure 3B:
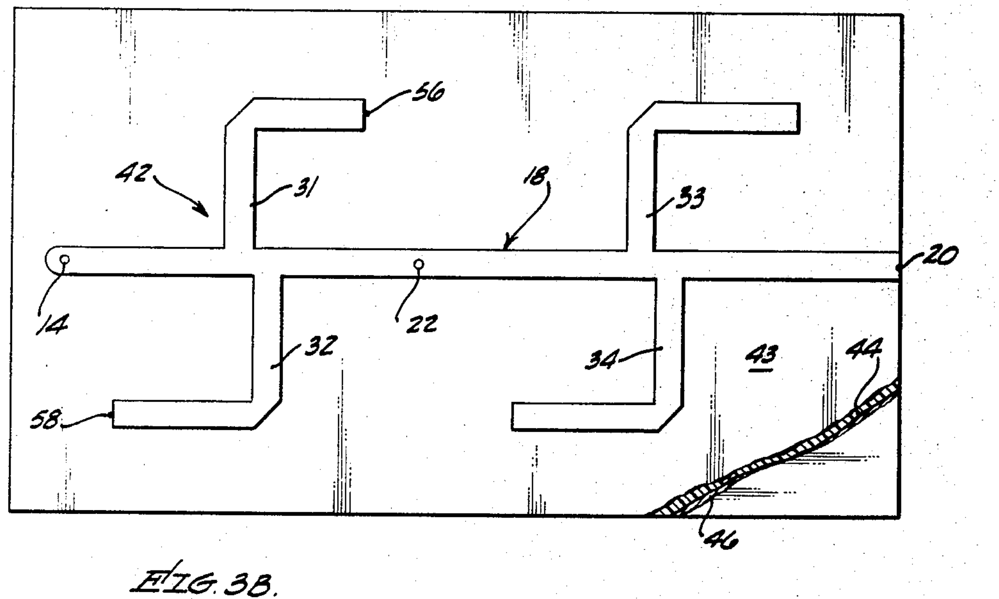

Referring to FIG. 3B, there is shown an alternate configuration of the stripline network 42 wherein the stubs 31, 32, 33 and 34 each form a right angle with the exterior corner beveled. In practice, it is only necessary for appropriate lengths to be maintained, the configuration of the stubs usually being adaptable to the overall dimensions allocated for stripline circuitry.

Figure 4:
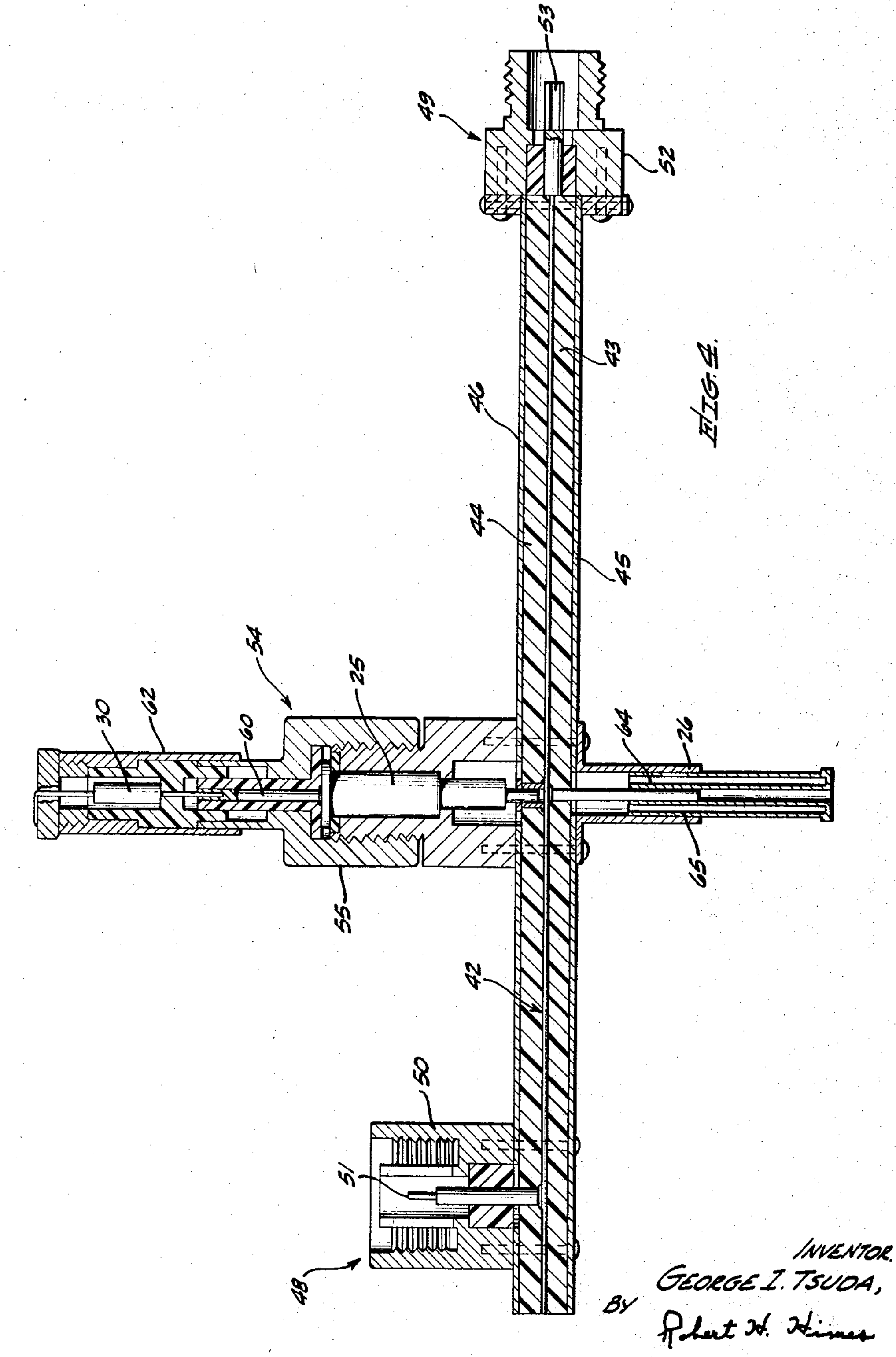
FIG. 4 shows a cross-section of the varactor holder and coaxial connectors of the apparatus of FIG. 2.

Referring to FIG. 4, there is shown a cross-sectional view taken through section 4—4, FIG. 2, wherein like reference characters designate the like elements. In particular, the center pins 51, 53 of coaxial connectors 48, 49 are connected directly to the stripline network 42 at the junctions 14, 20, respectively. Also, the varactor diode 25 has one connection maintained in contact with junction 22 and the remaining connection therefrom made to a center pin 60 which, in turn, connects to the resistor 30 which has its remaining lead returned to ground through a cap 62. The cap 62 is interchangeable to enable resistors having different values of resistance to be used. No cap 62 corresponds to a resistance approaching infinity, which choice has been found to achieve satisfactory operation. The tuning stub 26 is mounted opposite the housing 54 for varactor diode 25 at junction 22 on the stripline network 42. Tuning stub 26 includes telescoping inner and outer conductors 64, 65, respectively, shorted together at the extremity thereof farthest from the junction 22.

In the operation of the device of the present invention, a signal of fundamental frequency provided by signal source 12 is applied through the isolator 10 and bandpass filter 24 to the varactor diode 25 which resonates at the second harmonic thereof. Electrical energy at the second harmonic frequency passes around the band-rejection characteristic of band-rejection filter 28 and is available at junction 20. The remaining electrical energy at the fundamental frequency is returned through bandpass filter 24 where the isolator 10 diverts it through a load 16 thereby considerably enhancing the range of operation of the device of the present invention. The tuning stub 26 is adjusted for maximum output signal at the output junction 20. Lastly, the bias on varactor diode 25 is determined by the resistance of resistor 30 which may under certain circumstances approach infinity.

What is claimed is:

1. A parametric device for doubling the frequency and limiting the amplitude of an applied signal available from a preselected source, said device comprising first and second adjacent parallel conductive sheets, a substantial portion of said second conductive sheet being coextensive with said first conductive sheet; a first elongated flat conductive element disposed from a first junction to an output junction in a plane parallel to and intermediate said first and second conductive sheets, said first elongated flat conductive element having second, third and fourth junctions disposed therealong in the order named from said first junction to said output junction; means interconnected between said preselected source and said first junction for making said applied signal available at said first junction and for diverting reflections therefrom from said preselected source; first stripline means connected to said second junction constituting second and third elongated flat conductive elements disposed in said plane parallel to and intermediate said first and second conductive sheets and connected to opposite sides of said first elongated element at said second junction, said second and third elongated flat conductive elements each being of a length substantially equal to one-quarter wavelength at said fundamental frequency and being staggered with respect to each other; means disposed at the extremity of each of said second and third elongated conductive elements farthest from said second junction for providing a low impedance path to at least one of said first and second conductive sheets, thereby to provide a first filter at said second junction having a bandpass characteristic including the fundamental frequency of said applied signal; means including a varactor diode having one terminal thereof connected to said third junction for generating a signal of a frequency equal to twice said fundamental frequency; and second stripline means connected to said fourth junction for providing a second filter having a band-rejection characteristic including said fundamental frequency whereby said signal of a frequency equal to twice said fundamental frequency appears at said output junction.

2. A parametric device for doubling the frequency and limiting the amplitude of an applied signal available from a preselected source, said device comprising first and second adjacent parallel conductive sheets, a substantial portion of said second conductive sheet being coextensive with said first conductive sheet; a first elongated flat conductive element disposed from a first junction to an output junction in a plane parallel to and intermediate said first and second conductive sheets, said first elongated flat conductive element having second, third and fourth junctions disposed therealong in the order named from said first junction to said output junction; means interconnected between said preselected source and said first junction for making said applied signal available at said first junction and for diverting reflections therefrom from said preselected source; first stripline means connected to said second junction for providing a first filter having a bandpass characteristic including the fundamental frequency of said applied signal; means including a varactor diode having one terminal thereof connected to said third function for generating a signal of a frequency equal to twice said fundamental frequency; and second stripline means constituting second and third elongated flat conductive elements disposed in said plane parallel to and intermediate said first and second conductive sheets and connected to opposite sides of said first elongated element at said fourth junction, said second and third elongated flat conductive elements each being of a length substantially equal to one-quarter wavelength at said fundamental frequency and being staggered with respect to each other thereby to provide a second filter having a band-rejection characteristic including the fundamental frequency of said applied signal at said fourth junction whereby said signal of a frequency equal to twice said fundamental frequency appears at said output junction.

3. The parametric device for doubling the frequency and limiting the amplitude of an applied signal available from a preselected source as defined in claim 1 wherein the edge of said second elongated flat conductive element farthest from said first junction is disposed directly opposite the edge of said third elongated flat conductive element nearest said first junction.

4. The parametric device for doubling the frequency and limiting the amplitude of an applied signal available from a preselected source as defined in claim 2 wherein the edge of said second elongated flat conductive element farthest from said first junction is disposed directly opposite the edge of said third elongated flat conductive element nearest said first junction.

5. A stripline device for providing a filter operable over a predetermined band of frequencies, said predetermined band of frequencies having a mean frequency, said device comprising: first and second adjacent parallel conductive sheets, a substantial portion of said second conductive sheet being coextensive with said first conductive sheet; a first elongated flat conductive element disposed from an input junction to an output junction in a plane parallel to and intermediate said first and second conductive sheets, said first elongated flat conductive element having an intermediate junction disposed therealong intermediate said input and output junctions; second and third elongated flat conductive elements disposed in said plane parallel to and intermediate said first and second conductive sheets and connected to opposite sides of said first elongated element at said intermediate junction, said second and third elongated flat conductive elements each being of a length substantially equal to a multiple of one-quarter wavelength at said mean frequency and being staggered with respect to each other whereby said stripline device rejects electrical energy of frequencies within said predetermined band of frequencies when said multiple is odd and passes electrical energy of frequencies within said predetermined band of frequencies when said multiple is even.

6. The stripline device as defined in claim 5 where the edge of said second elongated flat conductive element farthest from said input junction is disposed directly opposite the edge of said third elongated flat conductive element nearest said input junction.

7. A stripline device for providing a filter operable over a predetermined band of frequencies, said predetermined band of frequencies having a mean frequency, said device comprising: first and second adjacent parallel conductive sheets, a substantial portion of said second conductive sheet being coextensive with said first conductive sheet; a first elongated flat conductive element disposed from an input junction to an output junction in a plane parallel to and intermediate said first and second conductive sheets, said first elongated flat conductive element having an intermediate junction disposed therealong intermediate said input and output junctions; second and third elongated flat conductive elements disposed in said plane parallel to and intermediate said first and second conductive sheets and connected to opposite sides of said first elongated element at said intermediate junction, said second and third elongated flat conductive elements each being of a length substantially equal to an odd multiple of one-quarter wavelength at said mean frequency and being staggered with respect to each other; and means disposed at the extremity of each of said second and third elongated conductive elements farthest from said intermediate junction for providing a low impedance band to at least one of said first and second conductive sheets whereby said stripline device passes electrical energy of frequencies within said predetermined band of frequencies.

8. The stripline device as defined in claim 7 wherein the edge of said second elongated flat conductive element farthest from said input junction is disposed directly opposite the edge of said third elongated flat conductive element nearest said input junction.

References Cited

UNITED STATES PATENTS

| | | | |
|---|---|---|---|
| 2,951,149 | 8/1960 | Grieg et al. | 333—84 |
| 2,962,716 | 11/1960 | Englemann | 343—720 |
| 3,051,844 | 8/1962 | Beam et al. | 333—84 |
| 3,056,933 | 10/1962 | Flood | 333—9 |
| 3,104,362 | 9/1963 | Matthei | 333—73 |
| 3,263,154 | 7/1966 | Steele | 321—69 |
| 3,268,795 | 8/1966 | Hudspeth | 321—69 |
| 3,287,621 | 11/1966 | Weaver | 321—69 |

ELI LIEBERMAN, *Primary Examiner.*

HERMAN KARL SAALBACH, *Examiner.*

C. BARAFF, *Assistant Examiner.*